US009960579B2

(12) United States Patent
Herth

(10) Patent No.: US 9,960,579 B2
(45) Date of Patent: May 1, 2018

(54) SELF SEATING ELECTRICAL ENCLOSURES

(71) Applicant: Greg Herth, Bellport, NY (US)

(72) Inventor: Greg Herth, Bellport, NY (US)

( * ) Notice: Subject to any disclaimer, the term of this patent is extended or adjusted under 35 U.S.C. 154(b) by 0 days. days.

(21) Appl. No.: 15/476,877

(22) Filed: Mar. 31, 2017

(65) Prior Publication Data

US 2017/0310095 A1 Oct. 26, 2017

Related U.S. Application Data

(60) Provisional application No. 62/325,276, filed on Apr. 20, 2016.

(51) Int. Cl.
*B26D 5/02* (2006.01)
*H02G 3/08* (2006.01)
*H02G 3/16* (2006.01)
*H01R 13/518* (2006.01)
*H01R 13/652* (2006.01)
*B23B 41/00* (2006.01)
*B26D 7/00* (2006.01)

(52) U.S. Cl.
CPC .............. *H02G 3/08* (2013.01); *B23B 41/00* (2013.01); *B26D 5/02* (2013.01); *H01R 13/518* (2013.01); *H01R 13/652* (2013.01); *H02G 3/16* (2013.01); *B23B 2205/00* (2013.01); *B26D 2007/0012* (2013.01)

(58) Field of Classification Search
CPC .................. H02G 3/08; B23B 2205/00; B26D 2007/0012; B26D 5/02
See application file for complete search history.

(56) References Cited

U.S. PATENT DOCUMENTS

| | | | | |
|---|---|---|---|---|
| 3,609,056 A | * | 9/1971 | Hougen | B23B 51/0426 408/204 |
| 7,658,136 B2 | * | 2/2010 | Rompel | B23B 51/0426 83/835 |
| 9,579,732 B2 | * | 2/2017 | Piller | B23B 51/0406 |
| D789,428 S | * | 6/2017 | Novak | B23B 51/0406 D15/139 |
| 9,724,766 B2 | * | 8/2017 | Novak | B23B 51/0453 |
| 9,751,134 B2 | * | 9/2017 | Thom | B23B 51/0406 |
| 9,782,839 B2 | * | 10/2017 | Novak | B23B 51/0406 |
| 9,782,840 B2 | * | 10/2017 | Funk | B23B 51/0453 |
| 9,808,869 B2 | * | 11/2017 | Novak | B23B 51/0406 |

* cited by examiner

*Primary Examiner* — Sean Michalski
(74) *Attorney, Agent, or Firm* — Alfred M. Walker

(57) ABSTRACT

A self-cutting, self-seating, self-securing electrical device is used for mounting lights and devices. It can be provided as an integral one piece box, with a saw ring blade provided as part of the round electrical work box, or the device can be provided without the built-in cutting saw ring blade, which is therefore provided as an add-on accessory which snaps into place within channel located along the top and channels on opposite sides of the downwardly extending round wall of the body of the self-seating electrical device. The self-seating electrical device also has two or more fasteners, such as three toggle swing clamps, to secure the electrical device in place in a cutout in a ceiling or interior or exterior wall panel, where the cutout is cut by the forward saw teethed blade edge of the electrical device.

24 Claims, 8 Drawing Sheets

SELF SEATING ELECTRICAL ENCLOSURES

RELATED APPLICATIONS

This application claims benefit and priority under 35USC § 119 (e) from provisional application Ser. No. 62/325,276 filed Apr. 20, 2016. The '276 application is incorporated by reference herein.

FIELD OF THE INVENTION

The present invention relates to hole cutting, self-seating electrical enclosures installed in cut holes in interior wall panels (e.g.—SHEETROCK ®) and exterior wall panels

SUMMARY OF THE INVENTION

This invention includes self-seating electrical devices, such as electrical work boxes or recessed lighting fixtures mounted in ceilings, floors, as well as in interior or exterior walls of a building structure. The devices can be any geographic shape, such as round, square, rectangular or polygonal. The devices preferably have a feature that saves time at installation since it cuts its own hole in an existing wall, ceiling or floor panel. It can be used for both old work boxes and new work boxes, as well as for any electrical device, such as recessed lighting. The self-seating electrical device is either designed with an integrally molded central pilot guide pin and circular saw projecting rearward from the back of the box, or it has features molded into the rear surface and sides to accept a removable ring-shaped circular saw and center pilot guide pin accessory. Inside the center of the box is a raised hexagonal molded boss with a hexagonal blind hole in its center. At the bottom of this central blind hole is a fastening tool, such as molded cross engageable with a Phillips screwdriver. To install a self-seating enclosure of this invention, a cordless drill/driver engages one of the central drive features of the box via a socket wrench, a hex driver, or a Phillips driver through to open front of the box, to spin the entire box with an integral or attached central pilot guide pin and circular hole saw to drill a pilot hole and then cut a hole matching the box diameter in a manner similar to that of using an ordinary hole saw. Once the hole has been made, if the device is a round box, the device can be installed in the normal fashion by seating the box flush with the front flange on the wall surface and then turning the toggle swing clamps to engage the inside surface of the wall. If the box is not round, after a round hole is cut through the panel, optionally the device can have built-in, serrated edge panels to be used as a saw to cut out excess material around the device circular hole.

Applicable materials for the round box or for the removable circular saw and pilot guide pin accessory are plastic, fiberglass, metal or combinations thereof. Standard box sizes can be accommodated such as 3" or 4" diameter boxes, but not limited to, for either a 2×2, 2×4 or 2×6 wall depth. A round box with features compatible with a removable circular saw and central pilot guide pin accessory need not be more expensive than one without the molded in features, so these round boxes can be standard electrical boxes since the features do not interfere with normal use.

For the circular box with the integrally molded saw and pilot guide pin feature, the box can be simply used to make the hole through the wall and then directly installed; this would be the least time consuming. The cut out circle of wall material would remain in the wall on the end of the box. Alternatively, the box can be removed from the wall, the cut-out wall material removed, and the box reinserted into the wall and locked in via the toggle swing clamps.

Similarly, for the circular box with the removable saw and pilot guide pin, again the box can be simply used to make the hole and be directly installed as the most convenient method. Thus the wall cut-out circle, and the removable saw and pilot guide pin would remain inside the wall; this should not present a problem. Alternatively, the box can be withdrawn from the hole after sawing through; the saw and pilot guide pin as well as the wall cutout can be removed, and the round box reinserted in the hole and locked in via the toggle swing clamps.

If the device is not round, after the circular hole is drilled in the panel, excess material can be removed to enlarge the round opening to a non-round shape with flat edges, such as square, rectangular or polygonal.

The electrical device can be mounted through wall panels, such as Sheetrock®, or other cutable wall or ceiling panel, or through an exterior vinyl siding mounting block and underlying foam insulation panel, if it is desirable to mount the electrical device to a building exterior wall.

In general, the self-seating enclosure can be an electrical work box, which includes a circular rear wall with a circular side wall forming on one side of the rear wall an interior of the work box and forming a front opening into the work box. The circular side wall has an extension from the rear wall and terminating in a free edge having saw teeth. A central pilot guide pin extends from the rear wall beyond the saw teeth, and the central pilot guide pin and saw teeth are adapted for driving an opening into a wall of a building structure for installation of the electrical box. A boss is mounted on an inside surface of the rear wall for accommodating a power tool for driving the central pilot guide pin and saw teeth into the wall panel to form the opening, whereby the work box is ultimately locked in the wall opening, produced by the self-seating box itself, by fasteners, such as a plurality of toggle swing clamps located within the work box, which are turned to engage an inside surface of the wall panel, thereby installing the electrical box in place ready for wiring, without attaching the electric box to any other portion of the building structure.

Preferably, the circular side wall has an optional flange extending from an outer front edge of the circular wall, surrounding an opening into the work box.

To mount the self-seating electric enclosure in a wall of a building, the following method steps are used. First, a central pilot guide pin extending from an outer surface of the rear wall of the work box is placed against an outer surface of the wall panel where the box is to be installed. This central pilot guide pin is surrounded by a circular wall having the aforementioned saw tooth edge, and the circular wall extends past the rear wall to form an outer surface of the work box, which encloses a hollow interior of the work box and with a front opening into the work box.

A boss is mounted on an inside surface of the rear wall within the work box. This boss is adapted to receive a power tool, to drive the central pilot guide pin and saw tooth, to form an opening into the wall to receive the work box. The power tool powers the central pilot guide pin to drill the hole. The plurality of toggle swing clamps mounted on the work box are turned to engage an inside surface of the wall panel, thereby installing the electrical box in place ready for wiring, without attaching the electric box to any other portion of the building structure. Optionally a portion of the wall panel detached by the saw teeth is removed before turning the toggle swing clamps, to lock the electric work box in place.

While the box can have a built-in rear ring of integrally molded serrated saw teeth, in an alternate embodiment. a removable, circular saw ring is mounted over the rear wall of the work box. In this embodiment, the saw ring may include optional cross pieces nesting on an outer surface of the bottom wall, where the central pilot guide pin extends beyond the saw ring supported by the cross pieces. Side latch members may be optionally provided for releasably engaging the circular or flat side wall of the device. In this embodiment, a boss is mounted on an inside surface of the rear wall to accommodate a power tool that drives the central pilot guide pin and saw teeth into the wall panel to form the opening, and the work box may be locked in the hole produced by the ring of saw teeth. Optionally the cross pieces are nested within molded depressions in the rear wall of the work box, and may have molded locator bumps to accurately lock in the saw ring. In this embodiment, toggle swing clamps are pivoted under the flange from a nested position within the outer wall to an extended position, along an inside surface of the building wall, and screw heads extend through the flange for allowing use of a tool to rotate the toggle swing clamp latches into deployed positions, locking the work box in place within the opening in the wall. The front flange of the box may have notches and cutouts to enable a user to plot out the location where the opening in the wall panel for insertion of the work box is to be located.

In another embodiment of the self-seating electrical enclosure with removable circular saw ring, the saw ring is attached to the work box by tabs and key holes.

In an alternate embodiment of the self-seating electrical enclosure, the device is square, rectangular or polygonal, so that the saw tooth cutting ring blade is advanced beyond the confines of the non-round enclosure beyond the thickness of the wall panel, whereby, after a circular hole is cut, excess material is cut way to fit the shape of the device being mounted.

The size of the height of the electrical box before attachment with the saw teeth ring blade may vary, from about 1.5" in height to about 2.5" in height. The height of the saw teeth ring blade, above the height of the electrical box, is at least about 0.75", so that it cuts through typical ⅝" SHEET-ROCK® or other wall panels.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE DRAWINGS

Figure 1:
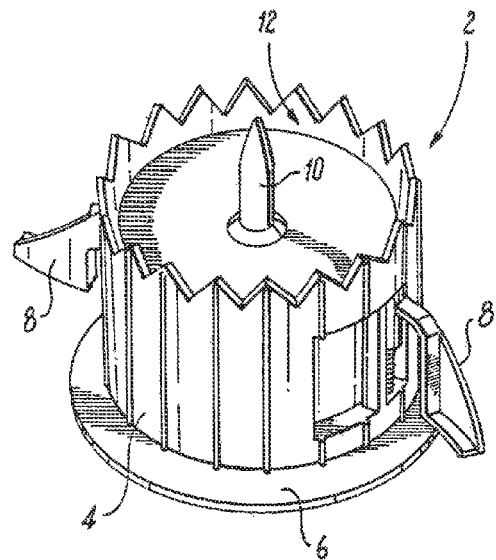
FIG. 1 is a rear perspective view of the integral unit (showing triangular saw teeth) of a round electrical box.

FIG. 1 shows the exterior rear of an integrally molded device, such as round box 2 of this invention with the deep round self-seating electrical work box 4 molded as one piece with a ring 12 of saw teeth and central pilot guide pin 10. Opposite front flange 6 and two of three toggle swing clamps 8 are shown.

Figure 2:
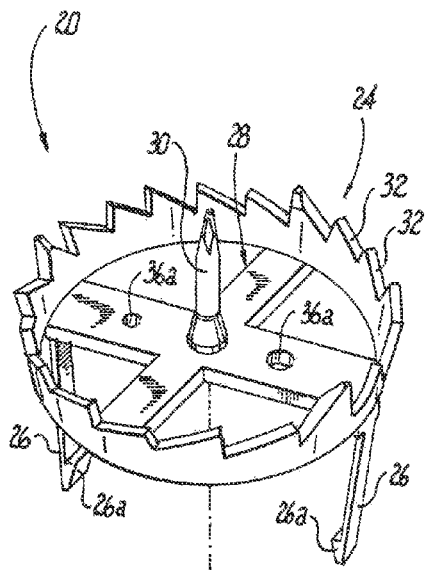
FIG. 2 is a rear perspective view of a second embodiment of a two piece round electrical box, shown in an assembled condition with a removable saw teeth bracket.
Figure 2:
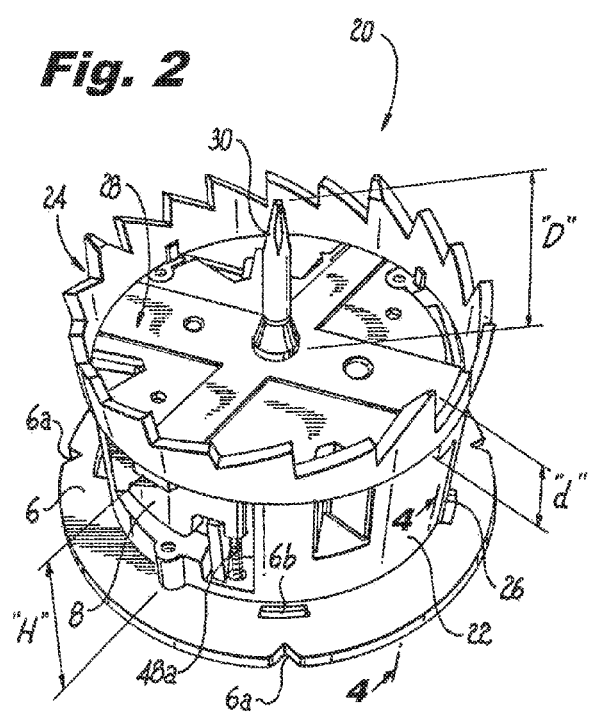

FIG. 2 shows the rear of the device, such as round box assembly 20, including round box 22 fitted with removable saw ring blade 24 with central pilot guide pin 30 and detent 26a of side latch piece 26 snapped in place over shallow round box 22, with optional support cross piece 28. Saw ring blade 24 is shown as a plastic part, but could be steel as well. Round box 22 also shows front flange 6 and swing clamps 8 movable by screws 48a. Fasteners, such as side latch pieces (legs) 26 are shown with distal end detents 26a to engage with shoulder ledge portions of round box 22. Notches 6a and cutouts 6b in front flange 6 are equidistant, to enable the user to plot out the location where the hole in the SHEETROCK® wall panel for insertion of the electrical work box 20 is to be located on the wall. FIG. 2 shows dimension "D" for the height of the central pilot guide pin 30, which is taller than dimension "d" of the height of the top of the saw teeth ring blade 24, so that the central pilot guide pin 30 can penetrate the wall panel before the saw teeth ring blade does also. FIG. 2 also shows the height "H" of the electrical box 22 may vary, from about 1.5" to about 2.5" in height.

Figure 3:
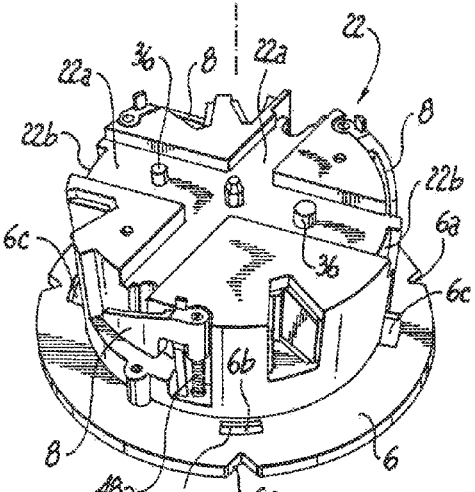
FIG. 3 is a rear perspective view of the two piece electrical box of FIG. 2, shown in an exploded condition with the saw teeth blade bracket removed.

FIG. 3 shows a round box assembly 20 with a saw ring blade 24 bracket with saw teeth 32, which is shown separated from round box 22, having optional nibs 36 for aligning with repetitive optional holes 36a in optional support cross piece 28. This part can be fabricated in a number of ways. If made of steel in one or more parts, a process of bending and, spot welding (including also for central pilot guide pin 30) can be used. Note that teeth 32 have a normal transverse set as in a normal saw for improved cutting as compared to the flat teeth of a plastic molded saw ring blade. It could also be a die cast part using a zinc alloy, Round box 22 also shows front end flange 6 and swing clamps 8 movable by screws 48a. Side latch pieces (legs) 26 are shown with distal end detents 26a to engage with shoulder ledge portions of round box 22. Round box 22 is optionally attached to saw ring blade 24 via legs 26 having these distal end detents 26a, to engage corresponding ledge descending side channels 22b, to accommodate the cross brace and descending side latch leg pieces 26 of the accessory circular saw ring blade 24 and central pilot guide pin 30. The detents 26a go through holes 6c in front end flange 6, and thence under the interior front wall 22c of round box 22. Top channels 22a are provided for cross brace pieces 28 of saw tooth blade 24 to rest therein. As also shown in FIG. 2, notches 6a and cutouts 6b of front flange 6 are equidistant, to enable the user to plot out the location where the hole in the SHEETROCK® wall panel for insertion of the electrical work box 20 is to be located on the wall.

Figure 4:
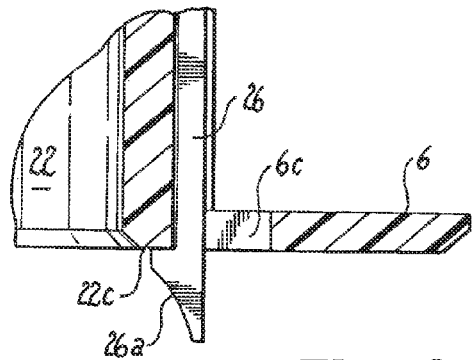
FIG. 4 is a close-up sectional elevation detail view, taken at 4-4 of FIG. 2, showing a leg of the saw teeth blade bracket attached to the box.
Figure 5:
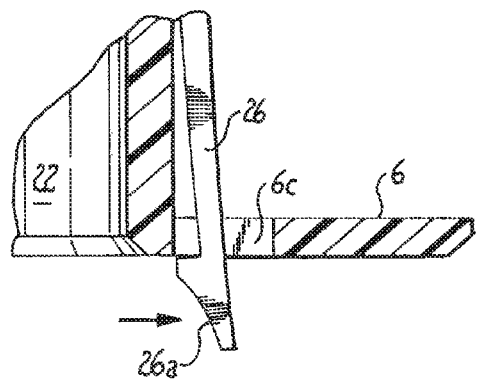
FIG. 5 is a close-up sectional elevation detail view, showing the flex of the leg of the saw teeth blade bracket in anticipation of removing the blade.
Figure 6:
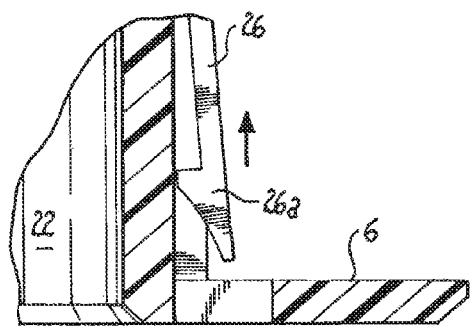
FIG. 6 is a close-up sectional elevation detail view, showing the upward removal of the leg of saw teeth blade bracket, in the direction of the arrow shown.

FIGS. 4, 5 and 6 show how distal end detents 26a of side legs 26 engage through holes 6c in flange 6 of round box 22, to removably attach saw teeth ring blade 24 onto round box 22.

For example, FIG. 4 shows a leg 26 with detent 26a of the saw teeth blade bracket 24 attached to the round box 22.

FIG. 5 shows the flex 26 with detent 26a of the leg of the saw teeth blade bracket in anticipation of removing the said ring blade bracket 24 from round box 22.

FIG. 6 shows the upward removal of the leg 26 with detent 26a of saw teeth blade bracket 24, in the direction of the arrow shown, away from round box 22.

Figure 7:
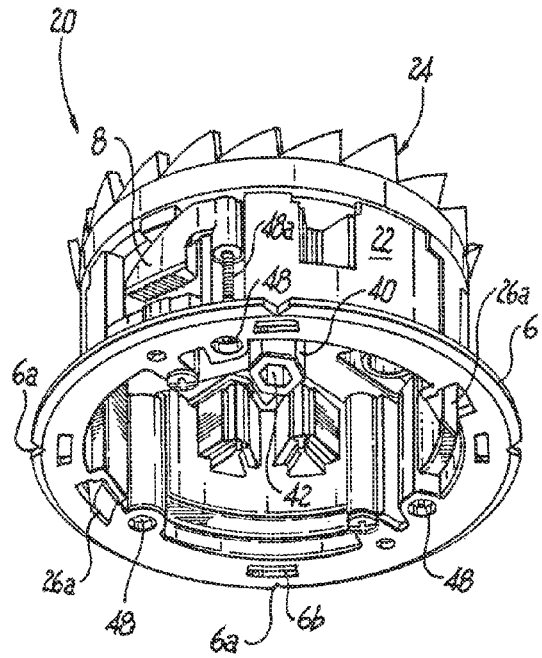
FIG. 7 is a front perspective view of the assembled box and saw teeth blade bracket, also showing the front flange, as well as the hollow interior of the round box of FIG. 2, showing the molded drive engagement features, including a hex boss with hex blind hole in its center and a Phillips cross in the center of the blind hole.

FIG. 7 shows a front perspective view of work box 20 assembled with saw tooth bracket 24 attachable to round box 22, corresponding to the front view of FIG. 2 and the exploded view of FIG. 3. FIG. 7 also shows flange 6 at the open front end of the device, such as a round box 22 and the interior wall of the round device box 22. Molded hexagonal boss 40 is prominently located at the center of the inside rear wall of box 22. Within the center of boss 40 is preferably hexagonal blind hole 42 and a fastener engaging area, such as a Phillips engagement cross 44, molded at the bottom of blind hole 42. Other drive contours optionally mate with a Robertson or square shank driver, which can be used instead of the central hexagonal blind hole 42. A choice of drive bits secured in the chuck of the drill/driver can be used to spin the box 22 with saw ring blade 24. Screw heads 48 of screws 48 controlling movement of the toggle swing clamps 8 are shown in this view. FIG. 7 also shows front flange 6 having outer notch 6a in one or more positions, such as, for example, four equidistant positions around the circumference of flange 6, as well as inner flange cutouts 6b, typically rectangular of any other geometric shape. As also shown in FIGS. 2 and 3, notches 6a and cutouts 6b are equidistant, to enable the user to plot out the location where, the hole in the SHEETROCKS® wall panel for insertion of the electrical work box 20 is to be located on the wall.

Figure 7A:
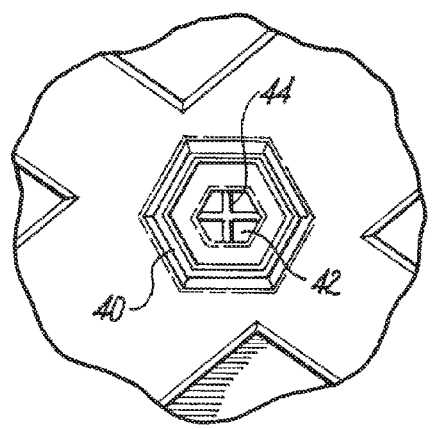
FIG. 7A is a close-up detail view of the hex boss of FIG. 7, looking into the bore toward the cross mount.

FIG. 7A shows a close-up view of the hex boss 40 and blind hole 42, with cross mount 44, on the inside rear wall of box 22.

Figure 8:
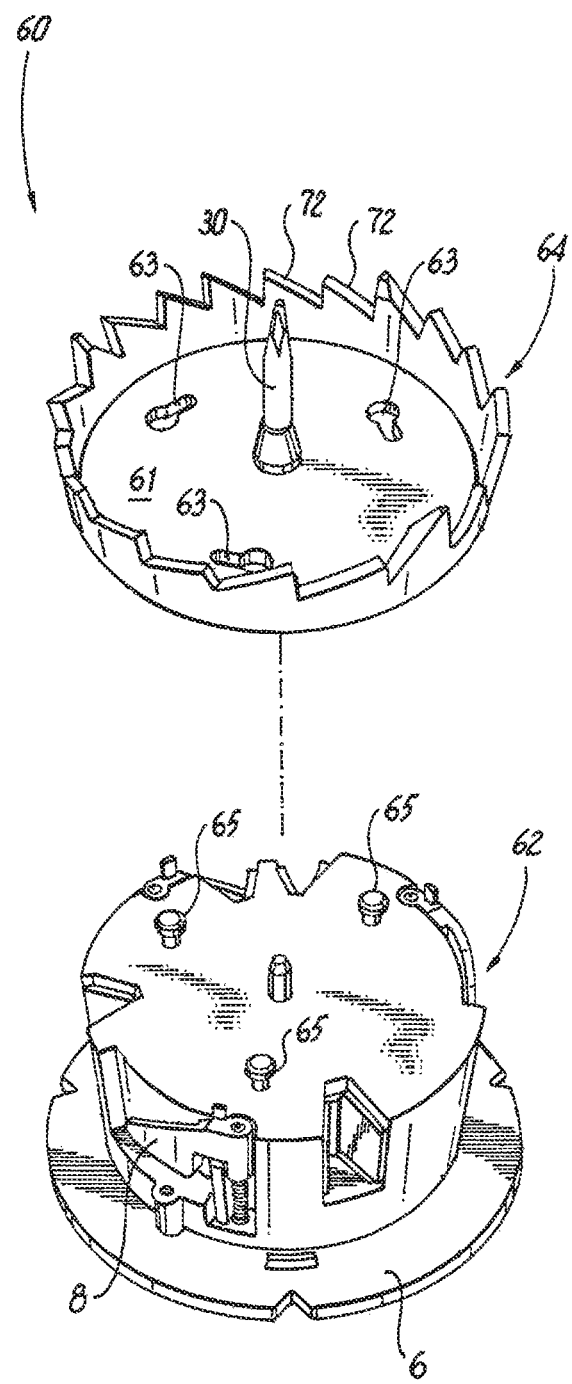
FIG. 8 is an exploded rear perspective view of another embodiment of a two-piece work box, wherein the saw teeth blade bracket is attached to the box by tabs and key holes.

FIG. 8 is an exploded view of an alternate embodiment of two-piece self-seating box assembly 60, including electrical box 62 and saw teeth ring blade 64. The circular saw teeth ring blade 64, has sharp protruding saw teeth 72, and upwardly extending central pilot guide pin 30, which are configured in a ring being a shallow pan with a floor. The floor 61 of saw teeth blade 64 contains key holes 63 (three are illustrated). Keyholes 63 can be turned in registration with tabs 65 protruding from box 62 in its rear wall. The two parts 62 and 64 are attached by turning slightly locking tabs 65 inside keyholes 62 by friction of engagement.

Figure 9:
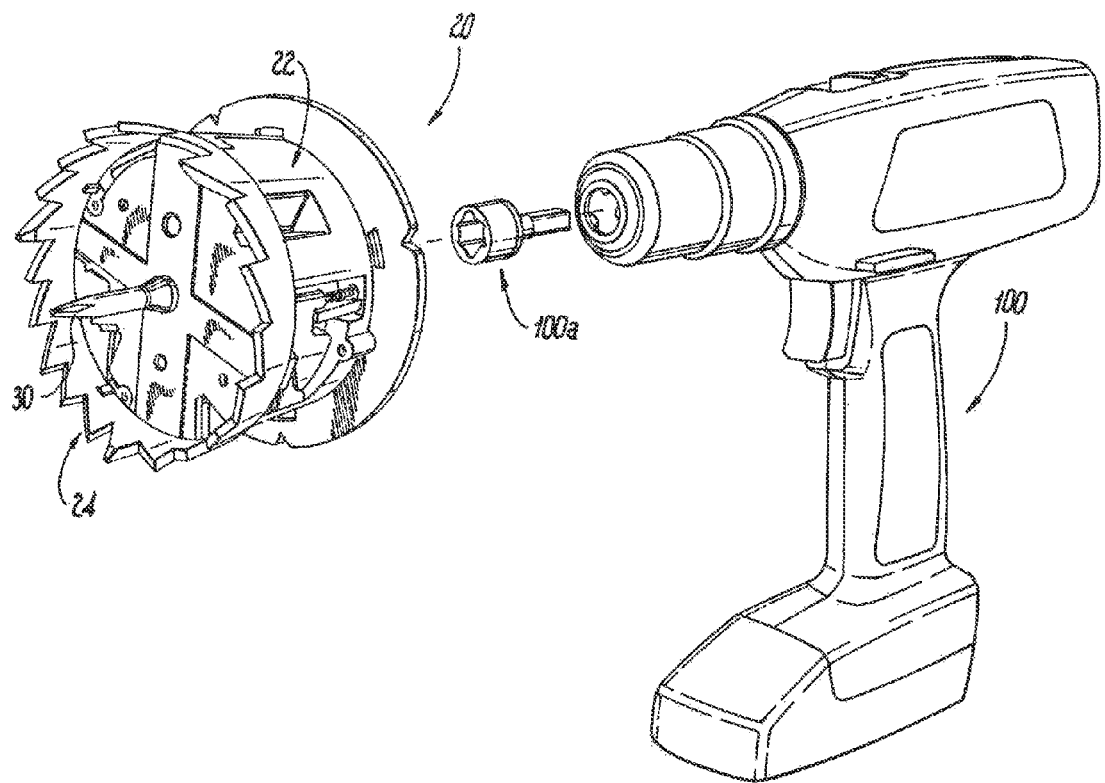
FIG. 9 is a rear perspective view of a first method step, showing the saw teeth blade bracket, hex adaptor and distal portion of a hand drill, shown in an exploded condition.
Figure 10:
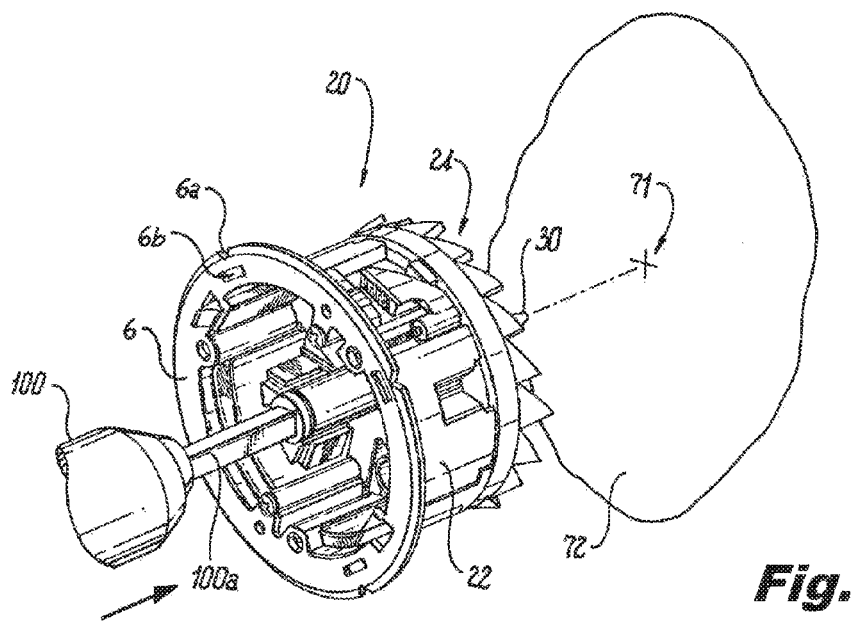
FIG. 10 is a front close-up detail perspective view of the assembly of FIG. 9, showing the saw teeth blade bracket, hex adaptor and distal portion of a hand drill, aiming for a location mark for installing the electrical box on an interior building wall panel.
Figure 11:
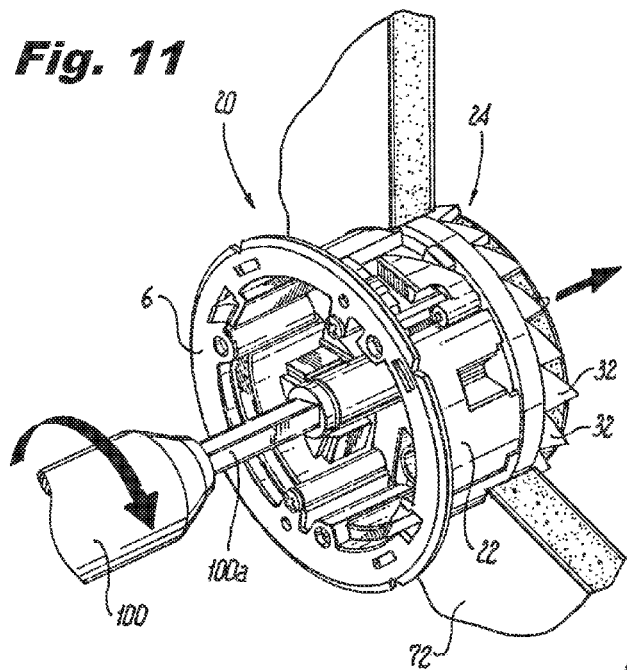
FIG. 11 is a front close-up detail perspective view of the assembly of FIGS. 9 and 10, showing the saw teeth blade bracket installed within the wall of FIG. 10.

FIGS. 9-13 show the self-seating device, such as electrical work box 2 or work box assembly 20, installed on a powered drill 100, where the torque of the drill 100 causes the forward central pilot guide pin 10 or 30 and rearward extending saw teeth 32 of the saw ring blade 24, to rotate and cut through a building interior wall or ceiling panel SHEETROCK® wall panel 72, as shown in FIG. 11, in a predetermined sized hole for accurately seating the electrical work box in a desired location therein. FIG. 11 shows the self-seating box 20 penetrating the SHEETROCK® or other wall board material 72.

FIG. 9 also shows the self-seating electrical work box assembly 20 having round box 22 and the circular saw ring blade 24 with central pilot guide pin 30 accessory attached and fitted thereto, being installed on drill attachment 100a of the powered drill 100. FIG. 9 also further shows that the rearwardly extending saw teeth 32 of circular saw ring blade 24 may be optionally skewed slightly outward, to affect better cutting through the SHEETROCK® wall panel.

FIG. 10 shows the powered drill 100 extending via attachment 100a through the open front end of box 22, and driving the self-seating assembly 20 toward interior wall panel 72, The assembly 20 includes the electrical work box 22 of FIG. 2, with flange 6, alignment notches 6a and alignment cutouts 6b attached to saw ring blade 24. The self-seating electrical work box assembly 20 is shown attached onto the hollow shank driver 100a of powered hand drill 100. Spot 71 shows the intended location for the central hole on the surface of wall panel 72.

FIG. 11 shows the powered drill 100 driving the self-seating device, such as the electrical work box assembly 20 of FIG. 2, into SHEETROCK® wall panel 72, in the direction of the arrow. Rotation of drill attachment 100a is also shown by a rotating arrow. The self-seating electrical work box assembly is optionally provided with a body 22 having a top channel 22a and descending side channels 22b to accommodate the cross brace and descending side latch pieces 26 of the accessory circular saw ring blade 24 and central pilot guide pin 30.

Figure 12:
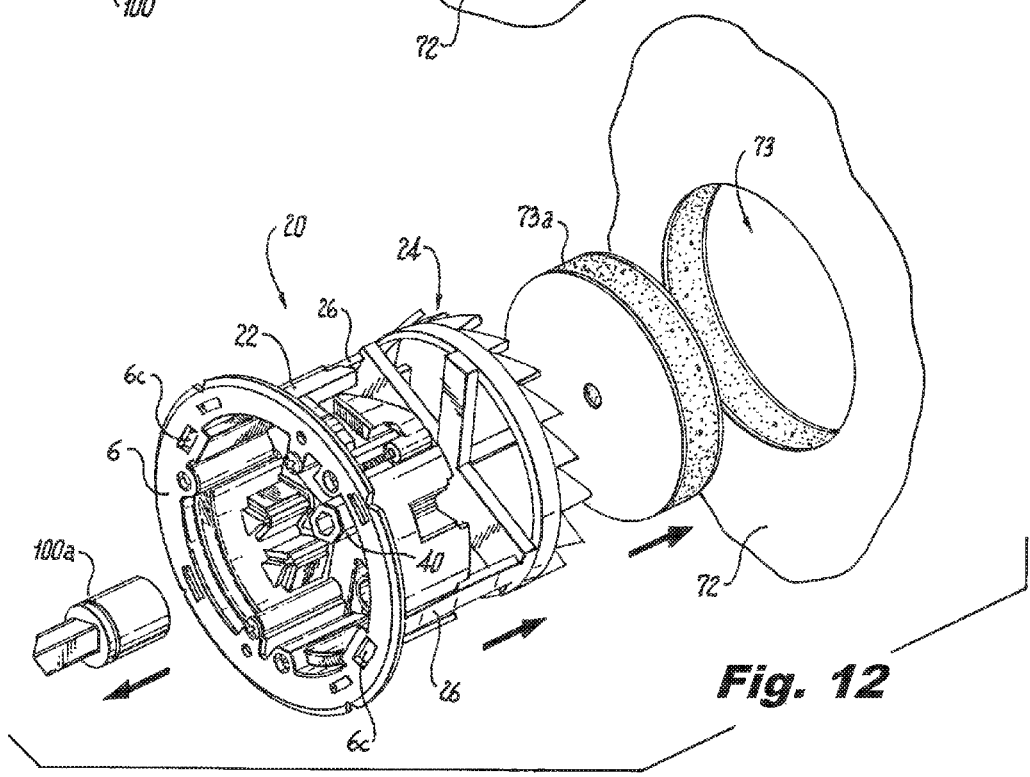
FIG. 12 is a front exploded detail perspective view of the assembly of FIGS. 9, 10 and 11, in an exploded condition, showing the electrical box pulled from the wall, with the drill removed, saw teeth blade bracket removed, and a cutout circular hole visible in the wall.

FIG. 12 shows the self-seating electrical work box assembly 20 of FIG. 2 being disconnected from the attachment 100a of the, powered drill 100, and what happens when hole 73 is drilled and excess circular material 73a is removed from hole 73 in wall panel 72. FIG. 12 also shows the large circular hole 73 cut in wall board 72 and removed excess material 73a, cut by the circular saw ring blade 24, at the end of box 20, after it is withdrawn from the hole. In fact, box 20 may be left in the bole seated flush with flange 6 and drill attachment 100a withdrawn from box 20, as shown in the direction of the arrow. FIG. 12 also shows circular saw ring blade 24 being disconnected from rear of electrical box 22, so that, after the cutting is done, the self-seating electrical work box body 22 is not fitted with a circular saw ring blade 24 and central pilot guide pin 10 accessory.

Figure 13:
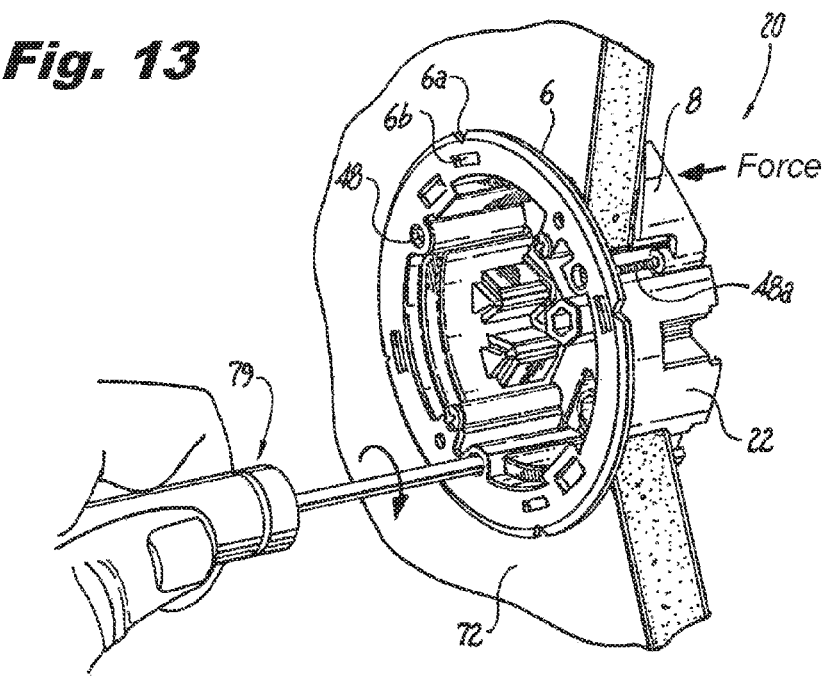
FIG. 13 is a front close-up detail perspective view of the assembly of FIGS. 9, 10, 11 and 12 showing the electrical box in the wall panel, and showing the latching deployment of the locking swing clamp tabs.

FIG. 13 shows the securement of electrical box 22 into wall panel 72 by the use of a screw driver to turn screws 48a, for rotating swing clamps 8 outward and driving them down with a force indicated by the arrow, to compress swing clamps 8 against the inside rear of wall panel 72.

Figure 14:
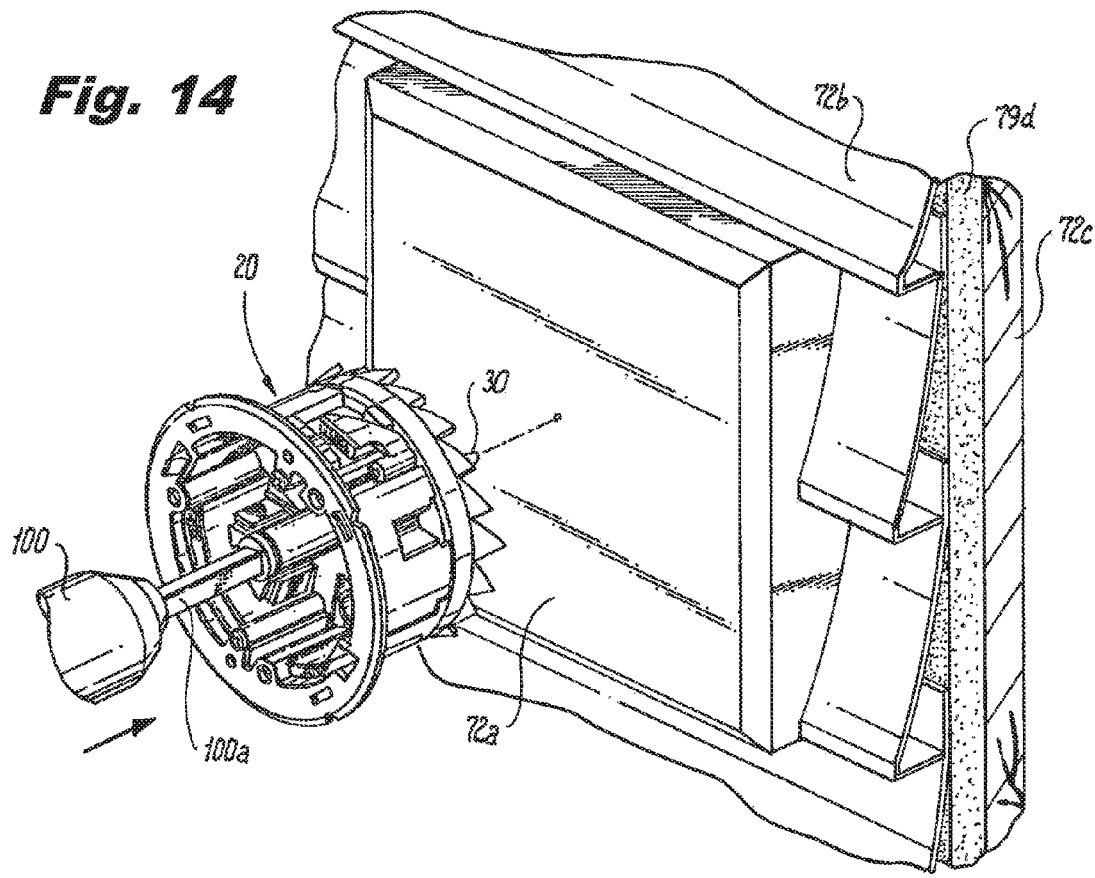
FIG. 14 is a front close-up detail perspective view of an alternate embodiment for an exterior wall installation, where a mounting block is used over vinyl siding covering an exterior building wall, showing the saw teeth blade bracket being mounted to the exterior mounting block of the exterior building wall.

As shown in FIG. 14, in exterior installation environments, electrical work box 20 can also be installed through amounting block 72a of exterior vinyl siding 72b of an exterior building wall 72c, and underlying foam insulation panels 79d therebetween, Adapter 100a with a hex bore drive head is engaged in the chuck of drill 100 and will spin box 20 into the mounting block 72a.

Figure 15:
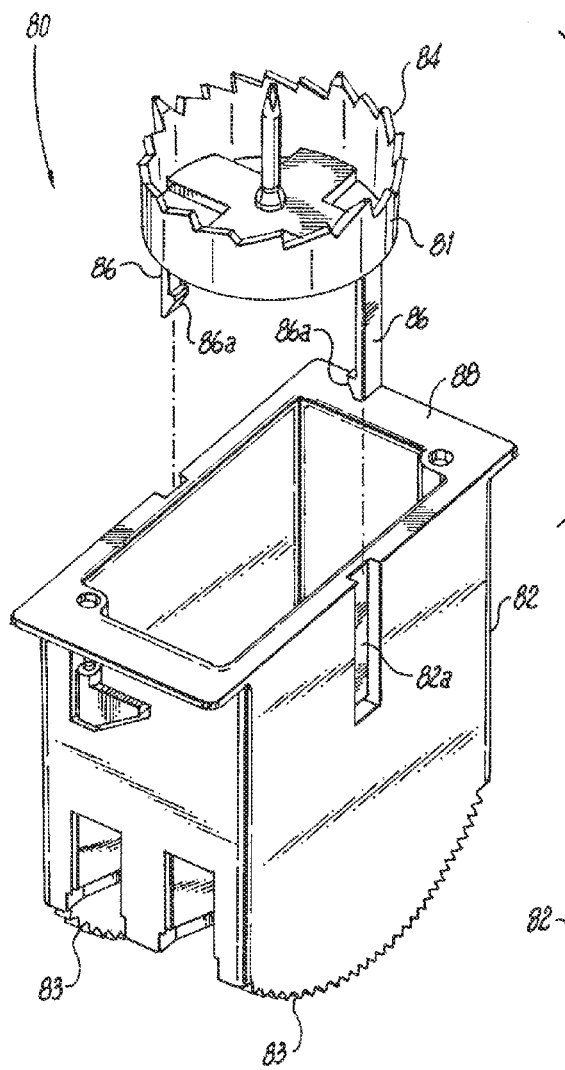
FIG. 15 is an exploded front perspective view of yet another embodiment, showing the round circular saw teeth blade bracket, to be mounted on a non-round, rectangular box, having sides with saw members having arrays of serrated saw teeth, which are used to manually remove, after a circular hole is cut, excess material, which is cut away, to fit the non-round shape of the electrical device being mounted.
Figure 16:
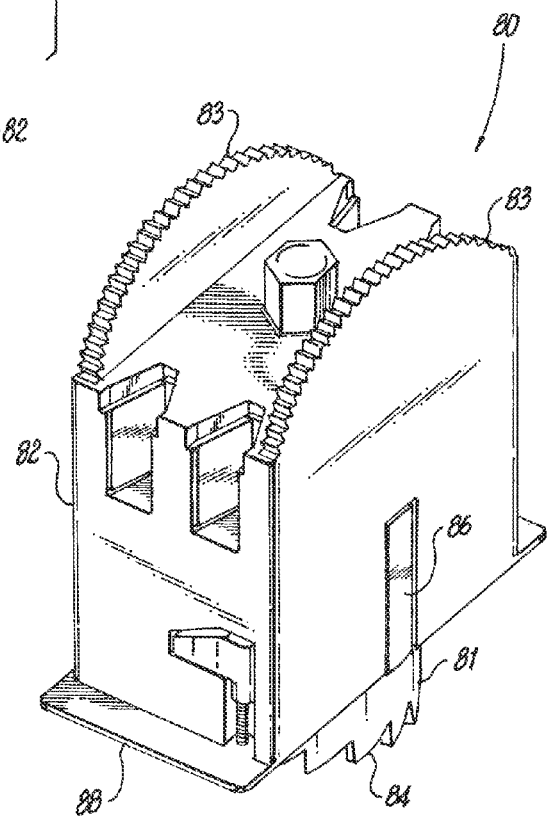
FIG. 16 is a rear perspective view of the third embodiment of FIG. 15, showing the saw teeth blade bracket on an opposite side of the electrical box from the arcuate serrated arrays positioned along respective opposite rear sides of the rectangular box.
Figure 17:
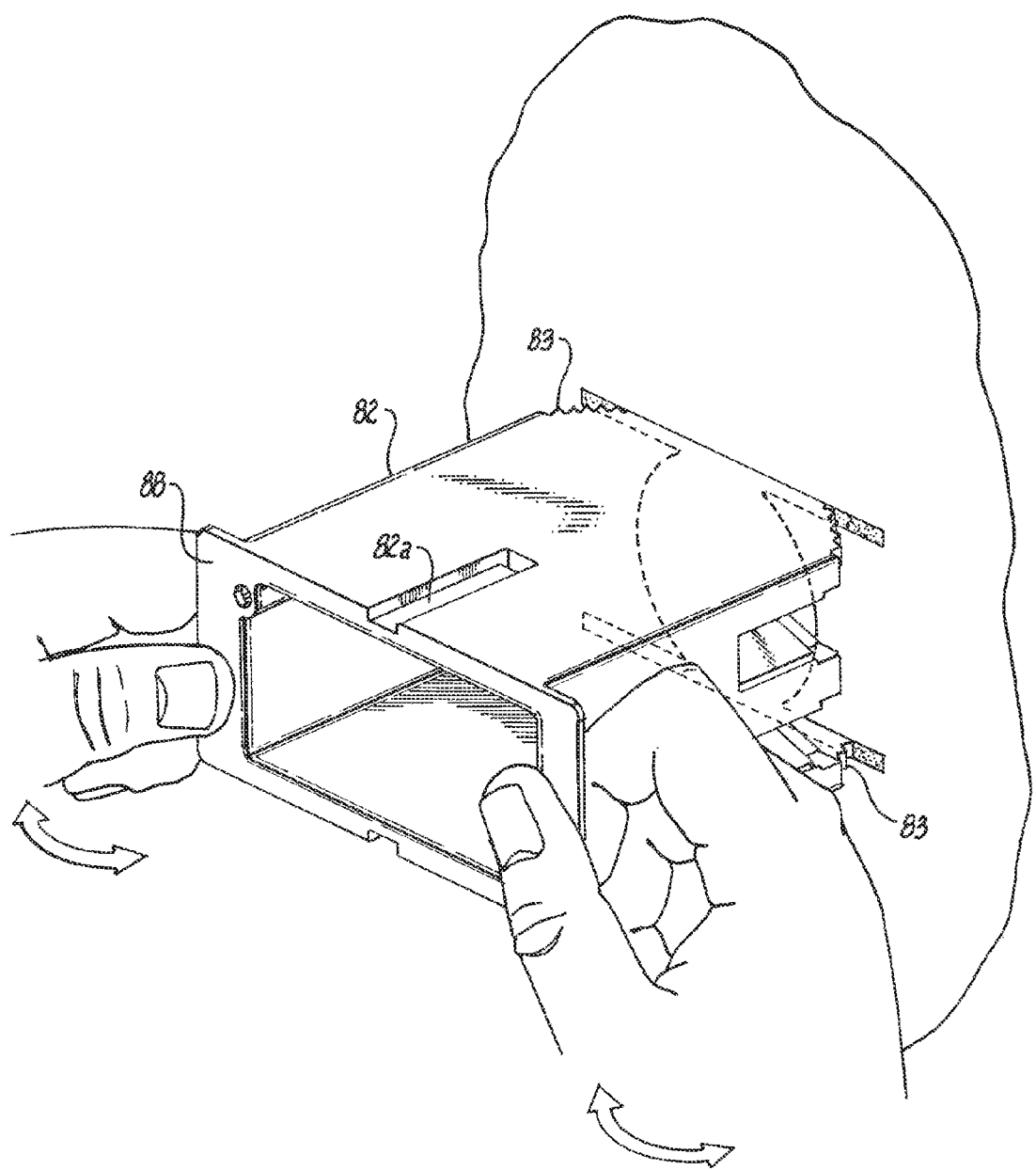
FIG. 17 is a front perspective view of the non-round box cutting marked, excess squared corner material, for removing excess material segments, required for the rectangular box cutout in which the rectangular box is to be placed.

FIGS. 15-17 are perspective view of another alternate embodiment of the self-seating electrical assembly 80, but where the electrical device 82 is square, rectangular or polygonal, with flat surfaces, so that the saw tooth cutting ring 81 is advanced rearward beyond the confines of the non-round device, whereby, after a circular hole is cut in a wall panel, excess material is cut away by distal arcuate serrated cutting edges 83 of box 82, to fit the shape of the enclosure being mounted. For example, FIGS. 15-17 relate to a self-seating non-round electrical box 82 which may be square, rectangular or polygonal. A rectangular box 82 is illustrated.

in FIG. 15 is shown in an exploded view with the self-seating square electrical box assembly 80 having anonround box 82, showing a top saw ring 81 with saw teeth 84, with a height which is larger than the typical thickness of about ⅝" of the SHEETROCK® or other wallboard to be penetrated. Saw ring blade 81 has attachment legs 86 with distal end detents 86a, which slide into channels 82a of box 82, below flange 88 of box 82. However, in FIG. 15, the saw teeth ring 81 attaches over the front of box 82, so that the rear of the box 82 can have arcuate serrated saw members 83 to cut away excess material around the circular cut hole, to fit a non-circular box 82.

FIG. 16 shows the saw ring 81 attached to box 82 having flange 88 and attached via side latch members 86 having detents 86a. Arcuate hand saw 83 with saw teeth extend outward from the side surfaces of box 82 in such fashion that they can be easily manipulated to remove excess material surrounding hole 73 in wall panel 72.

FIG. 17 shows manual manipulation of the front open end flange 88 of rectangular box 82, which circumscribes linear cuts around and beyond the boundary of round hole 73 in the wall panel 72. Distal end of saw 83 of box 82 is used to cut out the excess material around hole 73, so that a prepared rectangular hole results after removing corner areas of excess material of wall panel 72 with the serrated saw ends 83 of box 82. The dashed phantom lines of FIG. 17 show the circular line of hole 73 of FIG. 12, as well as linear lines created by manipulation of the serrated ends 83 of box 82, to create the rectangular boundary of the hole 73 to accept rectangular box 82 therein.

While FIGS. 1-4 show the respective saw ring mounted on the rear of an enclosure, such as an electrical box, and FIGS. 15-17 show conversely the saw ring mounted on a front of an enclosure, the reverse can be true, where the saw ring is mounted on a front of a round box, or on a rear of a non-round box.

In conclusion, preferably the self-cutting, self-seating, self-securing device, such as round or other geometric shaped self-seating electrical work box 20, is used for mounting lights and devices to interior walls, ceiling and exterior vinyl siding. It can be provided as an integral one piece box 2, with the saw ring blade 12 provided as part of the round electrical work box 2, or the box 20 can be provided without the built-in cutting saw ring blade 24, which is therefore provided as an add-on accessory 24 which snaps into place (or is otherwise surface attached) within channel 22a along the top and channels 22b on opposite sides of the downwardly extending round wall of the body 22 of the self-seating electrical work box 20. It can be provided in a variety of colors, such as, for example, wholesale gray, retail blue or OEM black, among other available colors. While sizes and shape may vary, a typical example of the self-seating electrical work box 2 or 20 has a four or four and a half inch diameter, with a depth of about 1½ inch depth, or 2½ inch depth but not limited to these exact dimensions. The self-seating electrical work box 2 or 20 is UL rated, and is made of materials such as plastics, including but not limited to polypropylene, polyethylene, polyvinyl chloride, metal, polycarbonate, fiberglass Lexan® fiber PC, and Noryl. All screw, holes are preferably tapped, and threaded, and the boxes 2 or 20 are supplied with fasteners, such as, for example, ⅝₃₂ fixture screws supplied. Notches 6a and slotted holes 6b in outer flange 6 of box 20 are provided for pencil marking when installing the box 20 conventionally. Raised mounting rings with a center hole are located on inside back wall of the electrical box for alternate surface mount installations onto basement or attic studs. The inside or outside of the body 22 of the electrical work box 20 has a raised center hex nut for receiving a nut driver, such as, for example, a 9/16 nut driver or 9/16 hollow shank. The box 2 or 20 is also provided with one or more, preferably four self-clamping wire inlets (2-#12 and 2-#14 awg). The self-seating electrical work box also has two or more holding, components, such as three toggle swing clamps 8.

The electrical work box also has new design features, such as a snap-in locking feature for the purpose of holding the holding components, such as toggle swing clamps 8, securely to the side wall of the electrical box 2 or 20 during installation. Optionally a non-slip footprint is provided for the purpose of securing the, base of each toggle swing clamp 8 to the back side of the panel, such as SHEETROCKS® wall panel or vinyl siding mounting block. Furthermore, the removable cutting saw ring blade 24 and central pilot, guide pin 10 or 30 allows for lightning fast installation, time savings and labor savings. The central piercing pilot guide pin 10 or 30 located at dead center of the, saw ring blade 24, which allows for pinpoint accuracy. The cutting teeth 32 on the saw ring blade 24 are designed to soften before entering the cut inside wall panel. This prevents nicks or cuts to pre-existing wires behind the ceiling or Sheetrock® wall panel or other interior or exterior cutable wall panel.

The self-seating electrical device, can be attached through an interior building wall or through an exterior building wall.

Moreover, the device can mount round boxes or non-round boxes, such as square, rectangular or other geometric shaped boxes with at least one flat wall.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention.

I claim:

1. A self-seating electrical enclosure comprising:
    a circular front wall with a circular side wall forming on one side of said bottom wall an interior of said work box and forming an opening into said work box;
    said circular side wall having an extension from an opposite rear side of said front wall and terminating in a rear free edge having save teeth;
    a central pilot guide pin extending from said opposite side of said rear wall beyond said saw teeth, said central pilot guide pin and saw teeth adapted for driving an opening into a wall of a building structure for installation of said electrical box;
    a boss mounted on an inside surface of said rear wall for accommodating a power tool for driving said central pilot guide pin and saw teeth into said wall to form said opening; and
    means for locking said work box in said opening.

2. The electrical enclosure of claim 1 in which said locking means comprises a plurality of toggle swing clamps located on said work box for being turned to engage an inside surface of said wall thereby installing said electrical box in place ready for wiring without attaching said electric box to any other portion of the building structure.

3. The electrical enclosure of claim 2 in which said circular side wall has a flange extending from an outer front edge of said circular wall surrounding a front opening into said work box.

4. A method, of mounting an electric enclosure in a wall of a building comprising the steps of:
    placing against an outer surface of said wall where said enclosure is to be installed a central pilot guide pin extending from an outer surface of a rear wall of said enclosure, said central pilot guide pin surrounded by a circular wall having a saw tooth edge, said circular wall extending past said rear wall to form an outer surface of said enclosure enclosing an interior of said enclosure and with a front opening into said enclosure;
    mounting a boss on an inside surface of said rear wall within said enclosure, said boss adapted to receive a power tool to drive said central pilot guide pin and saw tooth to form an opening into said wall to receive said enclosure;
    using a power tool to drill said hole; and
    turning a plurality of toggle swing clamps mounted on said enclosure to engage an inside surface of said wall thereby installing said electrical enclosure in place ready for wiring without attaching said electric enclosure to any other portion of the building structure.

5. The method of claim 4 in which a portion of said wall detached by said saw teeth is removed before turning said toggle swing clamps to lock said electric enclosure in place.

6. A self-seating electrical enclosure comprising:
    a front with a side wall forming an interior with an opening;
    said side wall having a front flange surrounding said opening;
    a removable, circular saw ring mounted over an opposite rear wall of said electrical enclosure;
    said saw teeth ring nesting on an outer surface of said rear wall, a central pilot guide pin extending beyond said saw ring, said saw ring having a saw tooth edge;
    a boss mounted on an inside surface of said rear wall for accommodating a power tool for driving said central pilot guide pin and saw teeth into said wall to form said opening; and
    said electrical enclosure having means to lock said device in said hole.

7. The electrical enclosure of claim 6 in which said saw teeth ring includes cross pieces nested within molded depressions in said rear wall of said electrical enclosure.

8. The electrical enclosure of claim 6 in which said cross pieces have molded locator bumps to accurately lock in said saw teeth ring.

9. The electrical enclosure of claim 6 in which said means to lock said electrical enclosure to said wall comprises toggle swing clamps pivoted from a nested position within said outer wall to an extended position along an inside surface of said building wall, and a screw heads extending through said flange for allowing use of a tool to rotate said latches into deployed positions locking said electrical enclosure in place within said opening in said wall.

10. The electrical enclosure of claim 9 in which said flange has notches and cutouts to enable a user to plot out the location where said opening in the wall for insertion of the electrical enclosure is to be located.

11. The electrical enclosure of claim 6 in which said saw ring is made of plastic.

12. The electrical enclosure of claim 6 in which said saw ring is made of metal.

13. The electrical enclosure of claim 6 in which said device is an electrical workbox.

14. The electrical enclosure of claim 6 in which said enclosure is a circular electrical work box.

15. The electrical enclosure of claim 6 in which said enclosure is an electrical work box having at least one flat wall.

16. The electrical enclosure of claim 15 in which said electrical work box has a plurality of flat walls.

17. A method of using a self-seating electrical enclosure comprising the steps of:
    providing an electrical enclosure comprising a rear wall with a circular side wall forming an interior with an opening, said side wall having a flange surrounding said opening at a front of said enclosure;
    placing a removable, circular saw teeth ring over a wall of said electrical enclosure, said saw ring nesting on an outer surface of said electrical enclosure, a central pilot guide pin extending beyond said saw ring and said saw ring having a saw tooth edge;
    attaching said saw teeth ring to releasably engage said side wall to secure said, saw ring on said electrical enclosure;
    using a power tool to engage a boss mounted on said electrical enclosure for driving said central pilot guide pin and saw teeth into said wall to form said opening;

removing said electrical enclosure from said opening;
releasing said saw teeth ring from said work box;
reinserting said electrical enclosure into said opening; and
using toggle swing clamps mounted on said electrical enclosure to lock said electrical enclosure in said opening.

18. The method of claim 17 in which said device is an electrical workbox.

19. The method of claim 17 in which said work box is circular.

20. The method of claim 17 in which said enclosure is an electrical work box having at least one flat wall.

21. The method of claim 17 in which said toggle swing clamps are pivoted under said front flange from nested positions within said outer wall to extended positions along an inside surface of said building wall to secure said electrical enclosure in said wall.

22. The method of claim 17 in which screw heads extending through said flange are used by a tool to rotate said toggle swing clamps into said extended positions.

23. The method of claim 17 further comprising adding at least one serrated edge panel to said electrical enclosure to cut away excess wall material to make the cut opening fit the exterior shape of the electrical enclosure.

24. The method of claim 17 wherein said electrical enclosure is installed to an exterior building wall mounting box.

* * * * *